(12) United States Patent
Avila et al.

(10) Patent No.: US 9,249,379 B2
(45) Date of Patent: *Feb. 2, 2016

(54) LIQUID LAUNDRY DETERGENT

(71) Applicant: Conopco, Inc., Englewood Cliffs, NJ (US)

(72) Inventors: David Victor Avila, Irby (GB); Stephen Norman Batchelor, Chester (GB); Jayne Michelle Bird, Ellesmere Port (GB); Peter William Elliott, Hoole (GB)

(73) Assignee: Conopco, Inc., Englewood Cliffs, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/407,096

(22) PCT Filed: Mar. 8, 2013

(86) PCT No.: PCT/EP2013/054784
§ 371 (c)(1),
(2) Date: Dec. 11, 2014

(87) PCT Pub. No.: WO2013/189615
PCT Pub. Date: Dec. 27, 2013

(65) Prior Publication Data
US 2015/0159121 A1    Jun. 11, 2015

(30) Foreign Application Priority Data

Jun. 21, 2012 (EP) .................................. 12172904

(51) Int. Cl.
| C11D 1/02 | (2006.01) |
| C11D 1/72 | (2006.01) |
| C11D 1/83 | (2006.01) |
| C11D 3/40 | (2006.01) |
| C11D 3/34 | (2006.01) |
| C11D 3/42 | (2006.01) |
| C11D 11/00 | (2006.01) |

(52) U.S. Cl.
CPC ......... *C11D 3/349* (2013.01); *C11D 1/83* (2013.01); *C11D 3/40* (2013.01); *C11D 3/42* (2013.01); *C11D 11/0017* (2013.01); *C11D 1/72* (2013.01)

(58) Field of Classification Search
CPC .............. C11D 1/02; C11D 1/72; C11D 1/83; C11D 3/40

See application file for complete search history.

(56) References Cited

FOREIGN PATENT DOCUMENTS

| EP | 2133410 | 12/2009 | | |
| WO | WO2007084729 | 7/2007 | | |
| WO | WO2007087252 | 8/2007 | | |
| WO | WO2007096067 | 8/2007 | | |
| WO | WO2008087497 | 7/2008 | | |
| WO | WO 2011/011799 | * | 1/2011 | ............... C11D 3/40 |
| WO | WO2011011799 | 1/2011 | | |
| WO | WO2011017719 | 2/2011 | | |

OTHER PUBLICATIONS

Search Report in EP12172904 dated Nov. 22, 2012; p. 1 to p. 3.
Search Report in PCTEP2013054784 dated Jun. 11, 2013; p. 4 to p. 6.
Search Report in PCTEP2013058489 dated Sep. 5, 2013; p. 7 to p. 9.
Written Opinion in EP12172904 dated Nov. 22, 2012; p. 10 to p. 13.
Written Opinion in PCTEP2013054784 dated Jun. 11, 2013; p. 14 to p. 17.
Written Opinion in PCTEP2013058489 dated Sep. 5, 2013; p. 18 to p. 21.

\* cited by examiner

*Primary Examiner* — Brian P Mruk
(74) *Attorney, Agent, or Firm* — Greenberg Traurig, LLP

(57) ABSTRACT

A colored laundry detergent is provided that photobleaches.

10 Claims, No Drawings

LIQUID LAUNDRY DETERGENT

BACKGROUND OF THE INVENTION

WO2011/011799 discloses shading dyes containing an anionic group covalently bound to alkoxy groups for use in laundry detergents to whitening textiles.

In liquid detergent products, shading dyes are used to shade white textiles. Shading dyes provide a vibrant colour to the detergent. In use, liquid detergents are frequently spilled or dripped onto hard surfaces such as washing machine tops and floors. They frequently drip down the outside of their containers and residues are left in dosing caps. The bright blue/violet colour given by the shading dye makes these unwanted spillages highly noticeable; this is especially the case with white goods. A method to reduce the visual impact is required.

SUMMARY OF THE INVENTION

Surprisingly shading dyes containing an anionic group covalently bound to alkoxy groups in laundry liquids have enhanced photodegradation in formulations containing non-ionic surfactants with 5 to 9 alkoxy groups per non-ionic surfactant molecules.

In one aspect the present invention provides laundry liquid detergent composition comprising:

(i) from 0.0001 to 0.01 wt %%, preferably 0.0003 to 0.003 wt %, of a shading dye comprising an anionic group covalently bound to alkoxy groups; and, (ii) from 5 to 70 wt % of surfactants selected from anionic and non-ionic surfactants, wherein the weight fraction of non-ionic surfactant is from 0.05 to 0.75, preferably from 0.1 to 0.6, more preferably from 0.3 to 0.6, most preferably from 0.45 to 0.55, of the total wt % of the anionic and non-ionic surfactants, wherein the non-ionic present has a non-ionic component T, which is an alkyl ethoxylate with a C12 to C15 primary alkyl chain and 7 to 9 ethoxy groups and is from 50 to 100 wt %, preferably 70 to 100 wt %, most preferably 90 to 100 wt % of the total non-ionic present, and wherein the dye is of the form:

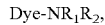

Dye-$NR_1R_2$, wherein the $NR_1R_2$ group is attached to an aromatic ring of the dye and at least one of the $R_1$ and $R_2$ groups is independently selected from: a polyoxyalkylene chain having 2 or more repeating units and is terminated by an anionic group, wherein the dye is a mono-azo dye and the anionic group is selected from: $CO_2^-$; and, $SO_3^-$.

DETAILED DESCRIPTION OF THE INVENTION

Surfactant

The composition comprises between 5 to 70 wt % of surfactants selected from anionic and non-ionic surfactants, most preferably 10 to 30 wt %. The fraction of non-ionic surfactant is from 0.05 to 0.75 of the total wt % of the anionic and non-ionic surfactant, preferably from 0.1 to 0.6, more preferably from 0.3 to 0.6, most preferably from 0.45 to 0.55.

In general, the nonionic and anionic surfactants of the surfactant system may be chosen from the surfactants described "Surface Active Agents" Vol. 1, by Schwartz & Perry, Interscience 1949, Vol. 2 by Schwartz, Perry & Berch, Interscience 1958, in the current edition of "McCutcheon's Emulsifiers and Detergents" published by Manufacturing Confectioners Company or in "Tenside-Taschenbuch", H. Stache, 2nd Edn., Carl Hauser Verlag, 1981. Preferably the surfactants used are saturated.

Non-Ionic

Suitable nonionic detergent compounds which may be used include, in particular, the reaction products of compounds having a hydrophobic group and a reactive hydrogen atom, for example, aliphatic alcohols, acids, amides or alkyl phenols with alkylene oxides, especially ethylene oxide either alone or with propylene oxide. Preferred nonionic detergent compounds are $C_6$ to $C_{22}$ alkyl phenol-ethylene oxide condensates, with 5 to 9 EO, i.e. 5 to 9 units of ethylene oxide per molecule, and the condensation products of aliphatic $C_8$ to $C_{18}$ primary or secondary linear or branched alcohols with ethylene oxide, with 5 to 9 EO.

The non-ionic surfactant preferably contains an alkyl alkoxylate. The alkyl alkoxylate is preferably an alkyl ethoxylate, with formula $R^1(OCH_2CH_2)_pOH$: where $R^1$ is an alkyl group that may be primary or secondary and contains C10-C16 carbon atoms. Most preferably R1 is a C12-C15 primary alkyl chain. p is from 5 to 9, preferably from 7 to 9.

The preferred alkyl alkoxylate is preferably greater than 50% of all the non-ionic present, more preferably greater than 70%, most preferably greater than 90%.

Anionic Surfactants

Suitable anionic detergent compounds which may be used are usually water-soluble alkali metal salts of organic sulphates and sulphonates having alkyl radicals containing from about 8 to about 22 carbon atoms, the term alkyl being used to include the alkyl portion of higher acyl radicals. Examples of suitable synthetic anionic detergent compounds are sodium and potassium alkyl sulphates, especially those obtained by sulphating higher $C_8$ to $C_{18}$ alcohols, produced for example from tallow or coconut oil, sodium and potassium alkyl $C_9$ to $C_{20}$ benzene sulphonates, particularly sodium linear secondary alkyl $C_{10}$ to $C_{15}$ benzene sulphonates; and sodium alkyl glyceryl ether sulphates, especially those ethers of the higher alcohols derived from tallow or coconut oil and synthetic alcohols derived from petroleum. Most preferred anionic surfactants are sodium lauryl ether sulfate (SLES), particularly preferred with 1 to 3 ethoxy groups, sodium $C_{10}$ to $C_{15}$ alkyl benzene sulphonates and sodium $C_{12}$ to $C_{18}$ alkyl sulphates. The chains of the surfactants may be branched or linear.

Soaps are also preferred. The fatty acid soap used preferably contains from about 16 to about 22 carbon atoms, preferably in a straight chain configuration. The anionic contribution from soap is preferably from 0 to 30 wt % of the total anionic.

Preferably, at least 50 wt % of the anionic surfactant are selected from: sodium $C_{11}$ to $C_{15}$ alkyl benzene sulphonates; and, sodium $C_{12}$ to $C_{18}$ alkyl sulphates. Even more preferably, the anionic surfactant is sodium $C_{11}$ to $C_{15}$ alkyl benzene sulphonates.

The anionic surfactant is not a zwitterionic surfactant.

Dye

The anionic alkoxylated dye is preferably blue or violet. The dye has a molar extinction coefficient at a wavelength in the range 400 to 700 nm of at least 10 000 $mol^{-1}$ L $cm^{-1}$, preferably greater than 30000 $mol^{-1}$ L $cm^{-1}$.

The anionic alkoxylated dyes are preferably of the following generic form: Dye-$NR_1R_2$. The $NR_1R_2$ group is attached to an aromatic ring of the dye. Where at least one of $R_1$ and $R_2$ are independently selected from polyoxyalkylene chains having 2 or more repeating units and preferably having 2 to 12 repeating units, wherein the polyalkylene chain is terminated by an anionic group. Examples of polyoxyalkylene chains include ethylene oxide, propylene oxide, glycidol oxide, butylene oxide and mixtures thereof.

The anionic alkoxylated dye is preferably a mono-azo dye.

Preferably the dye is of the form:

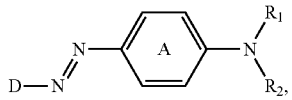

wherein D is an aromatic or hetroaromatic group and the A group may be substituted by further uncharged organic groups. D is preferably a phenyl or a thiophene. Examples of uncharged organic groups are methyl, ethyl, $NHCOCH_3$, methoxy, ethoxy.

Preferably the anionic group is $CO_2^-$ and $SO_3^-$, most preferably $SO_3^-$ (sulphonate). The anionic group of the dye may be part of a zwitterionic moiety however this is not preferred. An example of a zwitterionic group is:

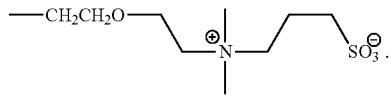

Preferably the polyoxyalkylene chain is a polyethoxylate with preferably 2 to 7 ethoxylates.

Preferably the mono-azo dye is a thiophene dye.

Preferably the only charged species on the dye is the $SO_3^-$ group.

Examples of dye are:

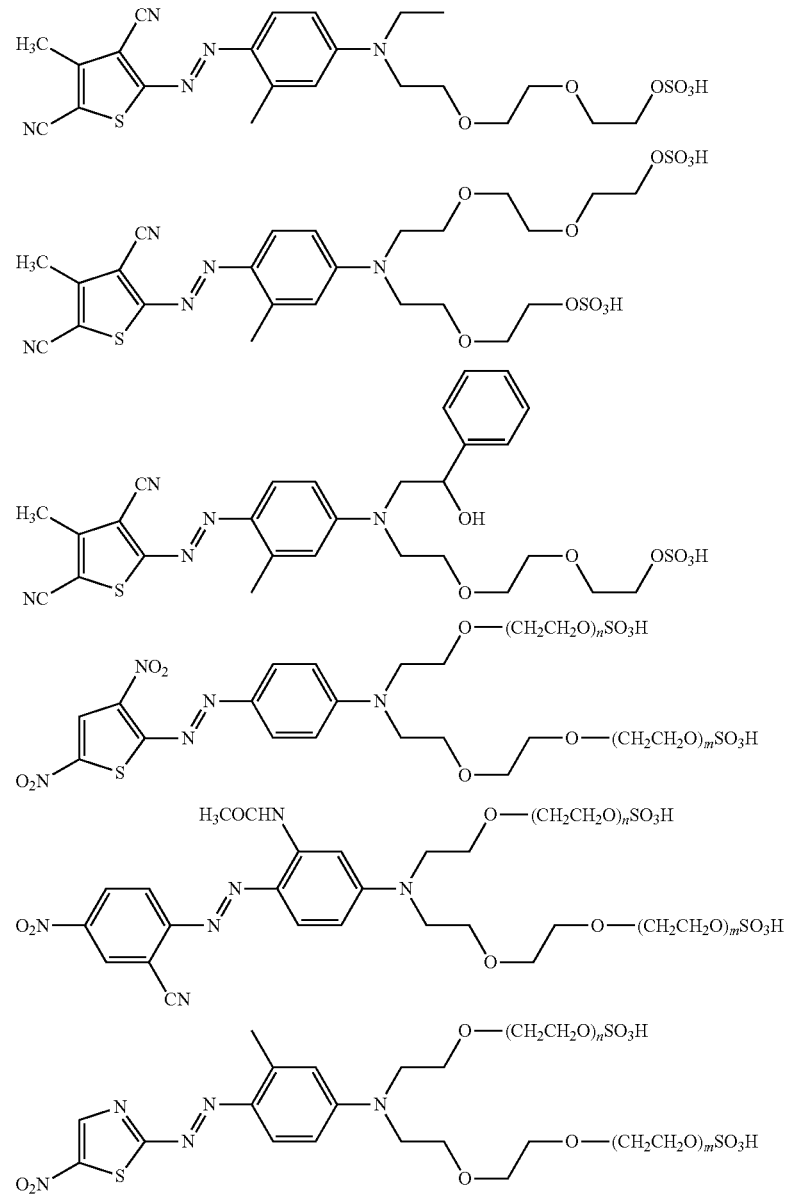

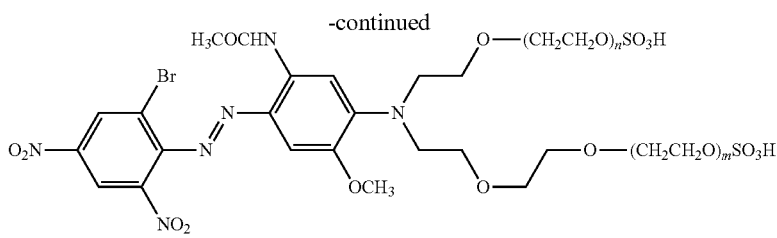

where n is from 0, 1, 2, 3, 4, 5, 6 or 7 and Where m is from 0, 1, 2, 3, 4, 5, 6 or 7

Most preferably the dye is of the form:

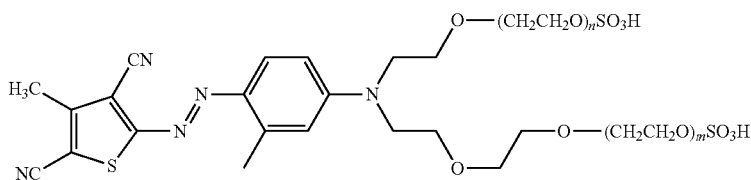

where n is from 0, 1, 2, 3, 4, 5, 6 or 7 and where m is from 0, 1, 2, 3, 4, 5, 6 or 7.

To prevent fading of the liquid on storage the liquid is preferably stored in a coloured plastic bottle, for example an orange, red or blue bottle.

The pH of the liquid detergent composition is preferably from 7 to 9. Preferably the liquid detergent composition comprises water, i.e., is aqueous and preferably the composition comprises from 5 wt % to 80 wt % water, most preferably from 10 to 80 wt % water. Preferably the pH of the aqueous liquid detergent composition is from 7 to 9.

Experimental

Detergent solutions were created containing 7.28 wt % anionic surfactant and 7.28 wt % non-ionic surfactant. The anionic surfactant was linear alkyl benzene sulfonate. The non-ionic was selected from a primary alkyl ethoxylate with a C12-C15 alkyl group. All alkyl chains used were linear, with the exception of 10EO which was branched. The degree of ethoxylation was as follows:

6EO: 6 moles of ethoxylate per 1 mole of alkyl group
7EO: 7 moles of ethoxylate per 1 mole of alkyl group
9EO: 7 moles of ethoxylate per 1 mole of alkyl group
10EO: 7 moles of ethoxylate per 1 mole of alkyl group
11EO: 7 moles of ethoxylate per 1 mole of alkyl group
20EO: 7 moles of ethoxylate per 1 mole of alkyl group
50EO: 7 moles of ethoxylate per 1 mole of alkyl group The anionic thiophene dye:

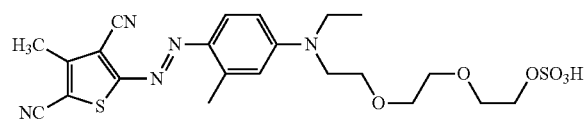

was added to the formulations, such that the optical absorbance (1 cm) at the maximum absorption in the range 400-700 nm was 1 to 1.3.

The UV-VIS spectra of the formulations were measure in a 1 cm plastic cuvette. The formulations in the plastic cuvettes were irradiated in a weatherometer for 30 minutes with simulated sunlight (385 W/m$^2$ 300-800 nm). The UV-VIS spectra were then recorded again and the % colour reduction calculated.

% colour reduction=[1−(Absorption after irradiation)/(absorption before irradiation)]×100.

The absorption values are the values at the maximum absorption of the dye with a 1 cm pathlength.

The experiments were repeated 3 to 8 times. The results are presented in the table below:

| Non-ionic | % colour reduction | 95% confidence limits | Number of repeats |
|---|---|---|---|
| 6EO (reference) | 47.6 | 3.5 | 8 |
| 7EO | 57.5 | 3.9 | 4 |
| 9EO | 61.0 | 5.2 | 4 |
| 10EO (reference) | 47.9 | 5.0 | 8 |
| 11EO (reference) | 43.1 | 4.2 | 8 |
| 20EO (reference) | 42.9 | 2.7 | 3 |
| 50EO (reference) | 43.0 | 1.9 | 4 |

The formulation containing the 7 and 9 EO groups chain show significantly more colour reduction on exposure to light.

We claim:

1. A laundry liquid detergent composition comprising:
   (i) from 0.0001 to 0.01 wt % of a shading dye comprising an anionic group covalently bound to alkoxy groups; and,
   (ii) from 5 to 70 wt % of surfactants selected from anionic and non-ionic surfactants,
   wherein a weight fraction of the non-ionic surfactants is from 0.05 to 0.75 of the total wt % of the anionic and non-ionic surfactants,
   wherein the non-ionic surfactants comprise an alkyl ethoxylate with a C12 to C15 primary alkyl chain and 7 to 9 ethoxy groups;

wherein the alkyl ethoxylate is from 50 to 100 wt % of a total weight of the non-ionic surfactants, and
wherein the dye is of the form:

Dye-$NR_1R_2$, wherein the $NR_1R_2$ group is attached to an aromatic ring of the dye and at least one of the $R_1$ and $R_2$ groups is independently selected from: a polyoxyalkylene chain having 2 or more repeating units and is terminated by an anionic group,
wherein the dye is a mono-azo dye and the anionic group is selected from: $CO_2^-$; and, $SO_3^-$.

2. A liquid detergent composition according to claim 1, wherein the alkyl ethoxylate is from 70 to 100 wt % of the total weight of the non-ionic surfactants.

3. A liquid detergent composition according to claim 2, wherein the alkyl ethoxylate is from 90 to 100 wt % of the total weight of the non-ionic surfactants.

4. A liquid detergent composition according to claim 1, wherein both $R_1$ and $R_2$ are the polyoxyalkylene chains.

5. A liquid detergent composition according to claim 4, wherein the polyoxyalkylene chain of the dye has from 2 to 12 repeating units.

6. A liquid detergent composition according to claim 1, wherein the dye is of the form:

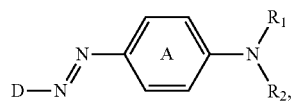

wherein D is an aromatic or heteroaromatic group.

7. A liquid detergent composition according to claim 1, wherein the dye is an azo-thiophene.

8. A liquid detergent composition according to claim 1, wherein the shading dye is present from 0.0003 to 0.003 wt % of the composition.

9. A liquid detergent composition according to claim 1, wherein the weight fraction of non-ionic surfactants is from 0.3 to 0.6 of the total wt % of the anionic and non-ionic surfactants.

10. A liquid detergent composition according to claim 1, wherein the pH of the liquid detergent composition is from 7 to 9.

* * * * *